United States Patent [19]

Sullivan

[11] Patent Number: 4,986,545

[45] Date of Patent: Jan. 22, 1991

[54] GOLF BALL COMPOSITIONS

[75] Inventor: Michael J. Sullivan, Chicopee, Mass.

[73] Assignee: Spalding Sports Worldwide, Tampa, Fla.

[21] Appl. No.: 449,774

[22] Filed: Dec. 13, 1989

[51] Int. Cl.$^5$ .............................................. A63B 37/12
[52] U.S. Cl. ................................ 273/235 R; 273/234; 524/908; 260/998.14
[58] Field of Search .......................... 273/235 R, 234; 525/201; 524/908; 260/998.14

[56] References Cited

U.S. PATENT DOCUMENTS

| | | | |
|---|---|---|---|
| 4,323,247 | 4/1982 | Keches et al. | 260/998.14 |
| 4,483,537 | 11/1984 | Hanada et al. | 524/908 |
| 4,526,375 | 7/1985 | Nakade | 273/235 R |
| 4,567,219 | 1/1986 | Tominaga et al. | 425/908 |

OTHER PUBLICATIONS

Abstract of Japanese Pat. No. 01-69656, Oki et al, 3/89.

*Primary Examiner*—Allan M. Lieberman
*Attorney, Agent, or Firm*—Fay, Sharpe, Beall, Fagan, Minnich & McKee

[57] ABSTRACT

The present invention relates to improved cover compositions for golf ball construction. The cover compositions comprise a blend of (1) modified thermoplastic rubber elastomers, wherein the thermoplastic rubber elastomers are modified with a polar group, such as maleic anhydride, and (2) ionomer resins.

In addition, the present invention is directed to golf balls produced utilizing the improved cover compositions. The golf balls exhibit properties of enhanced playability without sacrificing distance and/or durability.

4 Claims, No Drawings

GOLF BALL COMPOSITIONS

BACKGROUND OF THE INVENTION

The present invention is directed to improved golf ball cover compositions suitable for golf ball construction. More particularly, the present invention relates to novel golf ball compositions comprised of a blend of ionomeric resins and thermoplastic rubber elastomers modified with various polar groups.

In addition, the present invention is directed to golf balls produced utilizing the improved cover compositions. The golf balls exhibit properties of enhanced playability without sacrificing distance and/or durability.

Ionomeric resins are polymers containing interchain ionic bonding. As a result of their toughness, durability, and flight characteristics, various ionomeric resins sold by E.I. DuPont deNemours & Company under the trademark "Surlyn ®" have become the materials of choice for the construction of golf ball covers over the traditional "balata" (trans polyisoprene, natural or synthetic) rubbers. The softer balata covers, although exhibiting enhanced playability properties, lack the durability necessary for repetitive play.

Ionomeric resins are generally ionic copolymers of an olefin such as ethylene and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, i.e. durability, etc. for golf ball cover construction over balata. However, the advantages gained in increased durability have been offset to some degree by the decreases produced in playability.

While there are currently more than fifty commercial grades of ionomers available from DuPont with a wide range of properties which vary according to the type and amount of metal cations, molecular weight, composition of the base resin (i.e. relative content of ethylene and methacrylic acid groups) and additive ingredients such as reinforcements or additives, a great deal of research continues in order to develop golf ball cover compositions exhibiting not only the enhanced impact resistance and carrying distance properties produced by the "hard" ionomeric resins, but also the playability (i.e. "spin") characteristics previously associated with the "soft" balata covers, properties which are still desired by the more skilled golfer. Thus, an object of the present invention is to provide golf ball cover compositions which, when utilized in golf ball construction, produce golf balls exhibiting improved playability properties while maintaining satisfactory resilience and durability.

As is indicated in U.S. Pat. No. 4,674,751, the patent literature is replete with proposed cover formulations seeking to improve upon the balata and ionomer covers which have been commercially successful, i.e. see U.S. Pat. Nos. 3,819,768; 3,359,231; 4,398,000; 4,234,184; 4,295,652; 4,248,432; 3,989,568; 3,310,102; 4,337,947; 4,123,061, and 3,490,246. However, none of these patents disclose and/or suggest the particular compositions of the present invention and the improved characteristics produced by golf balls formulated with such compositions.

The present invention is directed to new golf ball cover compositions which exhibit properties of enhanced playability (i.e. softness and spin) without sacrificing carrying distance (i.e. coefficient of restitution) and/or durability. It has been found that these properties can be produced by using ionomeric resins in combination with thermoplastic rubber elastomers modified with various polar groups, such as maleic anhydride. Along this line, the present inventor discovered that contrary to the previous research in this area, the addition of newly developed polar modified thermoplastic rubbers to ionomeric resin compositions greatly improves the playability properties (i.e. decreases the hardness and increases the spin) of the compositions without adversely affecting the desired properties (i.e. cut resistance and/or resilience) produced by ionomeric resins.

SUMMARY OF THE INVENTION

The present invention is directed to improved golf ball cover compositions and the resulting golf balls produced utilizing the cover compositions. The novel golf ball cover compositions of the invention comprise a blend of (1) thermoplastic rubber elastomers modified with a polar group, such as maleic anhydride, and (2) ionomeric resins. When the cover compositions of the invention are utilized to manufacture golf balls, the golf balls produced exhibit properties of improved playability without sacrificing distance and/or durability.

Two of the principal properties involved in the performance of golf balls are resilience and hardness. Resilience is determined by the coefficient of restitution (C.O.R.), the constant "e", which is the ratio of the relative velocity of two elastic spheres after direct impact to that before impact. As a result, the coefficient of restitution (i.e. "e") can vary from zero to one, with one being equivalent to an elastic collision and zero being equivalent to an inelastic collision.

Resilience (C.O.R.), along with additional factors such as clubhead speed, angle of trajectory, and ball configuration (i.e. dimple pattern), generally determines the distance a ball will travel when hit. Since clubhead speed and the angle of trajectory are not factors easily controllable, particularly by golf ball manufacturers, the factors of concern among manufacturers are the coefficient of restitution (C.O.R.) and the surface configuration of the ball.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed solely to the coefficient of restitution which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e. the speed off the club) exceeding 255 feet per second. Since the coefficient of restitution of a ball is related to the ball's initial velocity, it is highly desirable to produce a ball having a sufficiently high coefficient of restitution to closely approach the U.S.-G.A. limit on initial velocity, while having an ample degree of softness (i.e. hardness) to produce enhanced playability (i.e. spin, etc.).

The hardness of the ball is the second principal property involved in the performance of a golf ball. The hardness of the ball can affect the playability of the ball on striking and the sound or "click" produced. Hardness is determined as the deformation (i.e. compression) of the ball under various load conditions applied across the ball's diameter (i.e. the lower the compression value, the harder the material). As indicated in U.S. Pat. No. 4,674,751, "softer" covers permit the accomplished golfer to impart proper spin. This is because the softer covers deform on impact significantly more than balls having "harder" ionomeric resin covers. As a result, this allows the better player to impart fade, draw, or backspin to the ball thereby enhancing playability. Such properties can be determined by various "spin rate tests", such as the "nine-iron" spin rate test set forth below.

Accordingly, the present invention is directed to new cover compositions which produce, upon molding around solid or wound cores, golf balls exhibiting a sufficient amount of hardness (i.e. softness) to improve the playability of the balls without adversely affecting the ball's distance (i.e. resilience) and/or durability (i.e. impact resistance, etc.).

These and other objects and features of the invention will be apparent from the following description and from the claims.

DESCRIPTION OF THE INVENTION

The present invention relates to improved cover compositions for golf ball construction. The cover compositions comprise a blend of (1) modified thermoplastic rubber elastomers, wherein the thermoplastic rubber elastomers are modified with a polar group, such as maleic anhydride, and (2) ionomer resins.

The thermoplastic rubber elastomers suitable for use in the present invention include modified copolymers of ethylene and propylene (i.e. ethylene-propylene rubbers (EPR)) and styrenic block copolymers. Styrenic block copolymers are manufactured in the U.S. by The Shell Chemical Co. and marketed under the tradenames of "Kraton D Rubber" (i.e. styrene-butadiene-styrene (SBS) and styrene-isoprene-styrene (SIS types)), and "Kraton G Rubber" (i.e. styrene-ethylene-butylene-styrene (SEBS) and styrene-ethylene-propylene-styrene (SEPS)).

In this regard, it has been discovered that thermoplastic rubbers which have been modified with a polar group, such as a newly developed maleic anhydride modified thermoplastic rubber sold by the Shell Chemical Co. under the designation "Kraton FG 1901X", are particularly well suited for use in golf ball cover construction. When the Kraton FG 1901X maleic anhydride modified thermoplastic rubber is blended with the specific ionomeric resins at the proportions set forth below and applied to a solid core to produce a molded golf ball, noticeable improvements in playability (i.e. spin properties, etc.) of the ball are produced without sacrificing the ball's durability (i.e. impact resistance, etc.), and/or resilience (coefficient of restitution) which relates directly to the distance that a golf ball will travel when struck under controlled conditions.

This is a particularly interesting discovery in that when the present inventor had previously attempted to blend the softer unmodified thermoplastic rubber elastomers with the harder ionomeric resins in order to improve the playability of the balls, the blends of the unmodified thermoplastic rubber-ionomeric resins suffered from inadequate compatibility, and thus produced covers which exhibited very poor durability (i.e. inadequate impact resistance). It was only when the thermoplastic rubber elastomers had been modified with a polar group, such as maleic anhydride, and blended with the relatively hard ionomeric resins, were improvements in both playability and durability exhibited. This is because it is believed that the polar or maleic anhydride group interacts (i.e. forms hydrogen bonds, etc.) with the acid groups of the ionomeric resins to produce a more compatible and homogenous mixture than the unmodified thermoplastic rubbers.

The maleic anhydride functionalized styrene block copolymers recently developed by the Shell Chemical Co. have been found to be particularly well suited for use in the present invention. Although these new copolymers have been used to generate super-tough blends with nylons, polyethylene terephthalate (PET), and PBT, and are also useful for compatible blends of dissimilar polymers, it was unknown until the development of the present invention that the modified styrenic block copolymers could be blended with ionomer resins in order to produce compositions useful for golf ball cover construction. As a result, Kraton FG 1901X thermoplastic rubber, which is a maleic anhydride-functionalized triblock copolymer consisting of polystyrene end blocks and poly(ethylene/butylene) (i.e. styrene-ethylene-butylene-styrene block copolymer (SEBS)) has been proven by the present inventor(s) to be an effective additive for ionomeric resin cover blends.

Shown in Table 1 below is a comparison of the mechanical properties of Kraton FG 1901X with "Kraton 1101", "Kraton G-2701", and "Kraton G-2706X", three unmodified styrene-diene thermoplastic block copolymers sold by the Shell Chemical Co.

TABLE 1

| Typical Properties of Modified and Unmodified Styrene-Diene Block Copolymers | | | | |
|---|---|---|---|---|
| | Kraton FG 1901X | Kraton 1101 (SBS) | Kraton G-2701 (SEBS) | Kraton G-2706X (SEBS) |
| Specific Gravity (g/cc) | 0.91 | 0.94 | 0.90 | 0.90 |
| Polymeric Styrene Content (% weight) | 28 | 30 | NA | NA |
| Functionality (% weight as bound maleic anhydride) | 2 | — | — | — |
| Hardness, Shore A | 75 | 71 | 67 | 28 |
| Tensile Strength, psi | 5,000 | 4,611 | 1,600 | 850 |
| Elongation at Break, % | 500 | 880 | 260 | 950 |

Furthermore, additional modified thermoplastic rubbers suitable for use in the present invention include other maleic anhydride modified thermoplastic rubbers currently under development by the Shell Chemical Co. under the "Kraton" designation. Examples of these additional modified thermoplastic rubbers include Kraton RP-6510 (containing about 0.5 weight % maleic anhydride (MA)), Kraton RP-52-14 (containing about 2.5 weight % maleic anhydride (MA)), Kraton RP-6505 (containing about 1.0% weight % maleic anhydride (MA)) and others listed below in Table 2. In this regard, Table 2 compares the variable differences of a large number of developmental maleic anhydride functionalized block copolymers to that of Kraton FG 1901X.

TABLE 2

Variable Differences in Developmental Maleic Anhydride Functionalized Block Copolymers Relative to Kraton FG 1901X

| Developmental Polymer | % MA | Block Mole Wt. Styrene | Block Mole Wt. Rubber | Wt % Styrene | % 3 Block Polymer |
|---|---|---|---|---|---|
| RP 52-14 | 2.5 | NC | NC | NC | NC |
| RP 6505 | 1.0 | NC | NC | NC | NC |
| RP 6510 | 0.5 | NC | NC | NC | NC |
| RP 50-1 | NC | + | + | NC | NC |
| RP 50-3 | + | + | + | NC | NC |
| RP 50-6 | − | + | + | NC | NC |
| RP 6509 | − | − | +VA | − | − |
| RP 6511-1 | −− | ++ | ++ | ++ | −− |
| RP 6511-2 | − | ++ | ++ | ++ | −− |
| RP 6511-3 | − | ++ | ++ | ++ | −− |

NC = No Change
− = Decrease
+ = Increase
VS = Very Slight

These additional modified thermoplastic rubbers, when used in the proportions and combinations set forth below to formulate golf ball cover compositions, produce golf balls exhibiting enhanced coefficient of restitution and durability without adversely affecting the playability of the balls.

In addition, it has recently been observed that the modified thermoplastic rubbers suitable for use in the present invention may also be blended with unmodified thermoplastic rubbers and ionomeric resins to produce golf balls exhibiting an increase in the coefficient of restitution (i.e. rebound) while maintaining the balls's overall playability characteristics. Along this line, it is believed that the modified thermoplastic rubbers act as a compatibilizer between the unmodified thermoplastic rubbers and the ionomeric resins. Since the unmodified thermoplastic rubbers are less costly than the modified thermoplastic rubbers, this observation offers many commercial advantages.

The ionomeric resins utilized to produce the cover compositions may be made according to known procedures such as those in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. The ionic copolymer comprises one or more α-olefins and from about 9 to about 20 weight percent of α, β-ethylenically unsaturated mono- or dicarboxylic acid, the basic copolymer neutralized with metal ions to the extent desired.

At least 20% of the carboxylic acid groups of the copolymer are neutralized by the metal ions, such as sodium, potassium, zinc, calcium, magnesium, and the like, and exist in the ionic state.

Suitable olefins for use in preparing the ionomeric resins include, but are not limited to, ethylene, propylene, butene-1, hexene-1, and the like. Unsaturated carboxylic acids include, but are not limited to acrylic, methacrylic, ethacrylic, α-chloroacrylic, crotonic, maleic, fumaric, itaconic acids, and the like. Preferably, the ionomeric resin is a copolymer of ethylene with acrylic and/or methacrylic acid. In addition, two or more types of ionomeric resins may be blended into the cover compositions in order to produce the desired properties of the resulting golf balls.

Although the scope of the patent embraces all known ionomeric resins suitable for use in the present invention, only a relatively limited number of these ionomeric resins are commercially available. In this regard, the ionomeric resins sold by E.I. DuPont de Nemours Company under the trademark "Surlyn ®", and the ionomer resins sold by Exxon Corporation under either the trademark "Escor ®" or the tradename "Iotek" are examples of commercially available ionomeric resins which may be utilized in the present invention in the combinations described in detail below. The ionomeric resins sold formerly under the designation "Escor ®" and now under the new name "Iotek", are very similar to those sold under the "Surlyn ®" trademark in that the "Iotek" ionomeric resins are available as sodium or zinc salts of poly(ethylene acrylic acid) and the "Surlyn" resins are available as zinc or sodium salts of poly(ethylene methacrylic acid). In addition, various blends of "Iotek" and "Surlyn" ionomeric resins, as well as other available ionomeric resins, may be utilized in the present invention.

Examples of commercially available ionomeric resins which may be utilized in the present invention include the sodium ionic copolymer sold under the trademark "Surlyn 8940" and the zinc ionic copolymer sold under the trademark "Surlyn 9910". Surlyn 8940 is a copolymer of ethylene with methacrylic acid with about 15 weight percent acid which is about 29% neutralized with sodium ions. This resin has an average melt flow index of about 2.8. Surlyn 9910 is a copolymer of ethylene and methacrylic acid with about 15 weight percent acid which is about 58% neutralized with zinc ions. The average melt flow index of Surlyn 9910 is about 0.7. The typical properties of Surlyn 9910 and 8940, as well as additional ionomeric resins which may be utilized in the present invention, are set forth below in Table 3.

TABLE 3

Typical Properties of Commercially Available Surlyn Resins Suitable for Use in the Present Invention

| | ASTM D | 9910 | 8940 | AD-8265 | AD-8269 |
|---|---|---|---|---|---|
| Cation Type | | Sodium | Zinc | Sodium | Sodium |
| Melt flow index, gms/10 min. | D-1238 | 2.8 | 0.7 | 0.9 | 0.9 |
| Specific Gravity, g/cm³ | D-792 | 0.95 | 0.97 | 0.94 | 0.94 |
| Hardness, Shore A/D | D-2240 | —/66 | —/64 | 92/39 | 84/25 |
| Tensile Strength, (kpsi), MPa | D-638 | (4.8) 33.1 | (3.6) 24.8 | (4.2) 28.8 | (3.1) 21.2 |
| Elongation, % | D-638 | 470 | 290 | 660 | 770 |

TABLE 3-continued

Typical Properties of Commercially Available
Surlyn Resins Suitable for Use in the Present Invention

|  | ASTM D | 9910 | 8940 | AD-8265 | AD-8269 |
|---|---|---|---|---|---|
| Flexural Modulus, (kpsi) MPa | D-790 | (51) 350 | (48) 330 | (7.1) 49.1 | (2.8) 19.3 |
| Tensile Impact (23° C.) KJ/m₂ (ft.-lbs./in²) | D-18225 | 760 (360) | 1010 (480) | 494 (235) | 447 (213) |
| Melting Point, °C. | DTA | — | — | 81 | 72 |
| Freezing Point, °C. | DTA | — | — | 51 | 38 |
| Vicat Temperature, °C. | D-1525 | 63 | 62 | 51 | 48 |

In addition, examples of ionomer resins suitable for use in the present invention sold under the "Iotek" tradename by the Exxon Corporation include "Iotek 4000" (formerly "Escor 4000"), "Iotek 4010", "Iotek 4000" (formerly Escor 900), "Iotek 8020", and "Iotek 8030". The typical properties of the Iotek ionomers are set forth below in Table 4.

TABLE 4

Typical Properties of Iotek Ionomers

|  |  | ASTM Method | Units | 4000 | 4010 | 8000 | 8020 | 8030 |
|---|---|---|---|---|---|---|---|---|
| Resin Properties |  |  |  |  |  |  |  |  |
| Cation type |  |  |  | zinc | zinc | sodium | sodium | sodium |
| Melt index |  | D-1238 | g/10 min. | 2.5 | 1.5 | 0.8 | 1.6 | 2.8 |
| Density |  | D-1505 | kg/m³ | 963 | 963 | 954 | 960 | 960 |
| Melting Point |  | D-3417 | °C. | 90 | 90 | 90 | 87.5 | 87.5 |
| Crystallization Point |  | D-3417 | °C. | 62 | 64 | 56 | 53 | 55 |
| Vicat Softening Point |  | D-1525 | °C. | 62 | 63 | 61 | 64 | 67 |
| Plaque Properties (3 mm thick, compression molded) |  |  |  |  |  |  |  |  |
| Tensile at break |  | D-638 | MPa | 24 | 26 | 36 | 31.5 | 28 |
| Yield point |  | D-638 | MPa | none | none | 21 | 21 | 23 |
| Elongation at break |  | D-638 | % | 395 | 420 | 350 | 410 | 395 |
| 1% Secant modulus |  | D-638 | MPa | 160 | 160 | 300 | 350 | 390 |
| Shore Hardness D |  | D-2240 | — | 55 | 55 | 61 | 58 | 59 |
| Film Properties (50 micron film 2.2:1 Blow-up ratio) |  |  |  |  |  |  |  |  |
| Tensile at Break | MD | D-882 | MPa | 41 | 39 | 42 | 52 | 47.4 |
|  | TD | D-882 | MPa | 37 | 38 | 38 | 38 | 40.5 |
| Yield point | MD | D-882 | MPa | 15 | 17 | 17 | 23 | 21.6 |
|  | TD | D-882 | MPa | 14 | 15 | 15 | 21 | 20.7 |
| Elongation at Break | MD | D-882 | % | 310 | 270 | 260 | 295 | 305 |
|  | TD | D-882 | % | 360 | 340 | 280 | 340 | 345 |
| 1% Secant modulus | MD | D-882 | MPa | 210 | 215 | 390 | 380 | 380 |
|  | TD | D-882 | MPa | 200 | 225 | 380 | 350 | 345 |
| Dart Drop impact |  | D-1709 | g/micron | 12.4 | 12.5 | 20.3 |  |  |

It has been discovered that a golf ball can be generally produced in accordance with the present invention from a central core and an outer cover wherein the outer cover is made from a composition comprising a blend of about 5 to about 50 parts by weight of a thermoplastic rubber elastomer modified with maleic anhydride and/or other polar modifying groups, and about 95 to about 50 of an ionomeric resin based on 100 parts by weight polymer in the composition.

More preferably, it has been found that a golf ball exhibited the properties of enhanced playability and durability without sacrificing traveling distance (i.e. C.O.R.) can be produced from a core and a cover wherein the cover is made from a composition comprised of about 15 to about 40 parts by weight of a thermoplastic rubber elastomer modified with maleic anhydride and/or other polar modifying group and about 85 to 60 parts by weight of an ionomeric resin based on 100 parts by weight polymer in the composition.

Most preferably, the golf ball of the present invention can be produced from a core and a cover wherein the cover is formed from a composition comprising 20 to 35 parts by weight of a thermoplastic rubber elastomer modified with maleic anhydride and/or other polar modifying groups and about 80 to about 65 parts of an ionomeric resin based on 100 parts by weight polymer in the composition.

Additional materials may also be added to the compositions of the present invention, dyes (for example, Ultramarine Blue sold by Whitaker, Clark, and Daniels of South Plainsfield, NJ), titanium dioxide, UV absorbers, antioxidants, and stabilizers. Moreover, the cover compositions of the present invention may also contain softening agents, such as plasticizers, etc., and reinforcing materials such as glass fibers and inorganic fillers, as long as the desired properties produced by the golf ball covers of the invention are not impaired.

The cover compositions of the present invention may be produced according to conventional melt blending procedures. Generally, the thermoplastic rubber elastomers modified with the polar groups, such as maleic anhydride, are blended with the ionomeric resins in a Banbury type mixer, two-roll mill, or extruder prior to molding. The blended composition is then formed into slabs and maintained in such a state until molding is desired. If necessary, further additives such as an inorganic filler, antioxidants, stabilizers, and/or zinc oxide may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches and weighing about 1.620 ounces. The standards for both the diameter and weight of the balls are established by the United States Golf Association (U.S.G.A.). Although both solid core and wound cores can be utilized in the present invention, as a result their lower cost and superior performance, solid molded cores are preferred over wound cores.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores.

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200°-300° F. for 2-10 minutes, followed by cooling at 50°-70° F. for 2-10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further processing steps such as buffing, painting, and marking.

The resulting golf balls produced from the novel ionomeric resin-polar modified thermoplastic rubber elastomers exhibit enhanced playability properties over the art without sacrificing distance and/or durability. This is because it is believed that the polar groups of the modified thermoplastic rubbers interact with the acid and ionic groups of the ionomeric resins to produce compatible mixtures which, upon processing, are sufficiently soft to enhance playability but hard enough to maintain the coefficient of restitution necessary for distance and durability.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

By blending the ingredients set forth in the Tables below, a series of cover formulations were produced. In the examples, cover formulations containing thermoplastic rubber elastomers modified with a polar group, such as maleic anhydride, and a number of different types of ionomeric resins were compared with unmodified thermoplastic rubber elastomer-ionomer resins. In addition, the properties produced by the cover compositions formulated with the unmodified and modified thermoplastic rubber-ionomeric resin blends were compared to the properties produced by the cover materials representative of the Tour Edition ® (see Example 1) and the Top Flite ® (see Example 2) balls currently being sold by Spalding & Evenflo Companies, Inc., Tampa, Florida. Although the specific formulations utilized to produce the Tour Edition ® and Top Flite ® balls are proprietary, these formulations were utilized under the same processing conditions as those set forth below in order to produce covered golf balls for comparison purposes.

Along this line, the Tour Edition ® ball is unique in that it is a two piece solid core, molded cover ball that meets the needs of golfers who demand superior control, historically obtained only with balata covered wound balls. It offers superior playability at the sacrifice of coefficient of restitution, which relates directly to distance.

The Top Flite ® ball is considered to be a "hard" Surlyn ionomeric resin ball. As a result of the ball's hardness, the Top Flite ® ball is a difficult ball for golfers to control. Generally, the harder the golf ball, the more difficult it is for a golfer to impart spin to the ball, and hence, control the ball during flight. However, as a result of its outstanding durability and maximum distance, the ball is widely accepted by a large percentage of golfers.

The present invention is directed to a blend of (1) a thermoplastic rubber elastomers modified with a polar group, such as maleic anhydride, and (2) an ionomeric resin, which, when utilized for golf ball cover compositions, produces golf balls possessing the superior playability properties exhibited by the current Tour Edition ® ball without sacrificing the coefficient of restitution (i.e. distance) associated with the Top Flite ® ball. In addition, the cover compositions of the present invention exhibit enhanced durability over unmodified thermoplastic rubber-ionomeric resin compositions which possess some of the desired properties of the cover compositions of the present invention.

The cover formulations set forth below in Tables 5 and 6 were injection molded at 400° F. around identical solid type cores having a finished diameter of 1.545 inches to produce golf balls approximately 1.680 inches in diameter having nominal cover thickness of 0.0675 inches. The properties of Riehle compression, coefficient of restitution (C.O.R.), Shore Hardness, impact resistance, and spin rate for the cover formulation were determined. In Tables 5 and 6, Examples 5 and 10 are identical, and Examples 6 and 11 are similar (i.e. different unmodified thermoplastic rubbers are utilized) in composition. These Examples have been set forth for comparison purposes under two separate testing conditions. The data for each example represents the average data for one dozen balls produced according to the desired manner. The properties were measured according to the following parameters:

Riehle compression is a measurement of the deformation of a golf ball in inches under a fixed static load of 225 pounds.

Coefficient of restitution (C.O.R.) was measured by firing the resulting golf ball is an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Cut resistance was measured in accordance with the following procedure: A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1-5. 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

The spin rate of the golf ball was measured by striking the resulting golf balls with a 9 iron in the manner as described above wherein the club-head speed is about 80 feet per second and the ball is launched at an angle of 26 to 34 degrees with an initial velocity of about 110-115 feet per second.

The spin rate was measured by observing the rotation of the ball in flight using stop action Strobe photography.

Initial velocity is the velocity of a golf ball when struck at a hammer speed of 143.8 feet per second in accordance with a test as prescribed by the U.S.G.A.

TABLE 5

|  | 1 | 2 | 3 | 4 | 5 | 6 | 7 | 8 |
|---|---|---|---|---|---|---|---|---|
| Ingredients |  |  |  |  |  |  |  |  |
| Kraton FG-1901X |  |  | 15 | — | 30 | — | 22.5 | — |
| Kraton G-2701 | — | — | — | 15 | — | 30 | — | 22.5 |
| Surlyn 9910 |  |  | 18.8 | 18.8 | 15.1 | 15.1 | 17.0 | 17.0 |
| Surlyn 8940 | — | — | 56.6 | 56.6 | 45.3 | 45.3 | 50.8 | 50.8 |
| White MB |  |  | 9.6 | 9.6 | 9.6 | 9.6 | 9.6 | 9.6 |
| Properties |  |  |  |  |  |  |  |  |
| Melt Index |  |  |  |  |  |  |  |  |
| 2160 g, 190 c |  |  |  |  |  |  |  |  |
| Weight, gms | 45.5 | 45.5 | 45.4 | 45.5 | 45.4 | 45.5 | 45.5 | 45.5 |
| Riehle Compression | 51 | 49 | 43 | 47 | 49 | 48 | 47 | 49 |
| C.O.R. | .802 | .816 | .811 | .807 | .805 | .804 | .809 | .806 |
| Shore A Hardness | 90-91 | 98 | 94 | 95 | 91 | 91 | 92 | 92 |
| Cut Resistance | 2-3 | 2-3 | 2-3 | 2-3 | 3 | 5 | 2-3 | 3-4 |
| (1 = Best, 5 = Worst) |  |  |  |  |  |  |  |  |
| Spin Properties |  |  |  |  |  |  |  |  |
| Launch Angle |  |  |  |  | 27.6 |  | 28.4 |  |
| Ball Speed |  |  |  |  |  |  |  |  |
| Spin Rate (RPM) |  |  |  |  | 8626 |  | 8472 |  |

TABLE 6

|  | 1 | 2 | 9 | 10 | 11 | 12 | 13 | 14 | 15 |
|---|---|---|---|---|---|---|---|---|---|
| Ingredients |  |  |  |  |  |  |  |  |  |
| Kraton FG-1901X |  |  | — | 30 | — | — | 30 | — | — |
| Kraton G-2706X |  |  | — | — | 30 | — | — | 30 | — |
| Kraton RP-6510 | — | — | — | — | — | 30 | — | — | 30 |
| Surlyn 9910 |  |  | — | 15.1 | 15.1 | 15.1 | — | — | — |
| Surlyn 8940 |  |  | — | 45.3 | 45.3 | 45.3 | — | — | — |
| Iotek 4000 |  |  | 45.2 | — | — | — | 30.2 | 30.2 | 30.2 |
| Iotek 8000 | — | — | 45.2 | — | — | — | 30.2 | 30.2 | 30.2 |
| Surlyn White MB |  |  | — | 9.6 | 9.6 | 9.6 | — | — | — |
| Iotek White MB |  |  | 9.6 | — | — | — | 9.6 | 9.6 | 9.6 |
| Melt Index | 1.6 | 2.8 | 4.8 | 0.66 | 2.9 | 1.0 | 1.3 | 6.1 | 2.5 |
| 2160 g, 190 c |  |  |  |  |  |  |  |  |  |
| Weight, gms | 45.7 | 45.6 | 45.7 | 45.3 | 45.5 | 45.3 | 45.4 | 45.3 | 45.4 |
| Riehle Compression | 54 | 51 | 48 | 52 | 55 | 54 | 54 | 54 | 53 |
| C.O.R. | .792 | .804 | .809 | .797 | .795 | .800 | .802 | .800 | .803 |
| Shore C Hardness | 87-88 | 95-96 | 96 | 87-88 | 86-87 | 87 | 89-90 | 88-89 | 88-89 |
| Cut Resistance | 2-3 | 2-3 | 2-3 | 2-3 | 4-5 | 2-3 | 2-3 | 4-5 | 2-3 |

TABLE 6-continued

|  | 1 | 2 | 9 | 10 | 11 | 12 | 13 | 14 | 15 |
| --- | --- | --- | --- | --- | --- | --- | --- | --- | --- |
| (1 = Best, 5 = Worst) | | | | | | | | | |
| Spin Properties | | | | | | | | | |
| Launch Angle | 30.0 | 31.8 | 32.6 | 29.7 | 29.8 | 30.2 | 30.4 | 30.7 | 30.4 |
| Ball Speed | 113.2 | 112.7 | 112.8 | 114.6 | 114.1 | 113.8 | 113.6 | 113.7 | 113.8 |
| Spin Rate (RPM) | 10117 | 8817 | 8066 | 10260 | 10218 | 10010 | 9706 | 9594 | 9679 |

DISCUSSION OF THE EXAMPLES

As indicated above, although blends of unmodified thermoplastic rubbers with ionomeric resins generally produce softer covers which exhibit enhanced playability, these covers have very poor durability. This is evident in Examples 6, 8, 11, and 14. In Examples 6 and 8, Kraton G-2701 is blended with hard Surlyn grades 9910 and 8940 to produce relatively soft covers (i.e. Riehle Compressions of 48 and 49 and C.O.R.s of 0.804 and 0.806) in comparison to the hard Top Flite ® cover composition set forth in Example 2 (i.e. the Top Flite ® covers exhibit an average compression of 45 and an average C.O.R. of 0.816). The same can be seen in Examples 11 and 14 except Kraton G-2706X was utilized as the unmodified thermoplastic rubber. In addition, in Example 14, Iotek 4000 and Iotek 8000 were substituted for the Surlyn ionomeric resins.

In this regard, significantly higher compressions, lower hardness values, and lower C.O.R.s indicate that the balls would have a softer feel and are thus, more readily deformed by a golf club. As a result of the additional deformation, a golfer can put more spin on the ball and, hence, impart better control over the ball.

However, while softer covers were produced by the unmodified thermoplastic rubber-ionomeric resin blends, the durability of the covers also drastically decreased. This can be seen in the cut resistance values of 4–5. The results are very similar to those produced by balata covered balls. Thus, while the playability of the covers produced from the unmodified thermoplastic rubber-ionomeric resin blends increased to some degree, the durability of the covers produced was insufficient for repetitive play.

Examples 5 and 7 in Table 5 and Examples 10, 12, 13, and 15 in Table 6 involve cover formulations produced according to the present invention. Specifically, these examples involve covers produced from various polar modified (i.e. maleic anhydride modified) thermoplastic rubber-ionomer resin blends. Example 12 is similar to Example 10 except Kraton RP-6510 is used as the modified thermoplastic rubber elastomer as opposed to FG-1901-X. Examples 13 and 15 are similar to Examples 10 and 12 respectively, except that the Surlyn ionomeric resins were substituted with Iotek ionomeric resins. The pigment concentrates were also changed to enhance compatibility.

The examples of the present invention (i.e. Examples 5, 7, 10, 12, 13, and 15) exhibit properties of enhanced playability demonstrated by the unmodified thermoplastic rubber-ionomeric resins without sacrificing distance and/or durability. This can be seen in that the Riehle compressions, Shore C hardness, and C.O.R.s of the covers of the formulations of the present invention are similar to the covers of the unmodified thermoplastic rubber-ionomeric resin formulations. For example, the values of the average Riehle compressions and C.O.R.s for Examples 5 and 7 are 48 and 0.807, respectively, and for Examples 6 and 8 the values are 48.5 and 0.805 respectfully. These values are very close to the intermediate values produced by the combination of the desired properties of the Tour Edition ® ball (Example 1) and the Top Flite ® ball (Example 2).

Furthermore, as demonstrated by the cut resistance results, the durability of the cover compositions of the present invention (i.e. 2–3 in Examples 5 and 7) is greatly improved over the unmodified thermoplastic rubber-ionomeric resin blends of Examples 6 and 8 (i.e. 4–5). The same results can be seen in the comparison of Examples 10, 12, 13 and 15 which are directed to the polar modified thermoplastic rubber-ionomer resin blends of the present invention versus Examples 11 and 14 concerning the unmodified thermoplastic rubber-ionomer resin formulations.

In addition, in order to demonstrate that other maleic anhydride functionalized thermoplastic rubber elastomers sold under the "Kraton" trademark are also effective in the present invention, the above Examples were repeated with additional maleic anhydride modified Kraton rubbers. In this regard, Kraton RP-6510 contains about 0.5 weight percent maleic anhydride, Kraton RP-5214 contains about 2.5 weight percent maleic anhydride, and RP-6505 1.0 weight percent maleic anhydride. The results listed in Table 7 below demonstrate that the additional maleic anhydride modified thermoplastic rubber elastomers when blended with ionomeric resins such as those sold under the Surlyn ® designation offer higher coefficient of restitution (C.O.R.) than the current Tour Edition ® ball. See Examples 17–20.

In addition, the data set forth in Table 7, indicates that blends of maleic anhydride modified thermoplastic rubbers and unmodified thermoplastic rubbers produce increases in the coefficient of restitution (C.O.R.) over the current Tour Edition ® ball. As mentioned above, it is believed that the maleic anhydride modified thermoplastic rubber elastomers act as a compatibilizer between the unmodified thermoplastic elastomers and the ionomer resins.

TABLE 7

|  | % MA | 1 | 2 | 16 | 17 | 18 | 19 | 20 | 21 |
| --- | --- | --- | --- | --- | --- | --- | --- | --- | --- |
| Kraton FG-1901X | 2.0 |  |  | 15.0 | — | — | — | — | 15.0 |
| Kraton 2706X | — |  |  | 15.0 | — | — | — | — | — |
| Kraton 1651 | — | — | — | — | — | — | — | — | 15.0 |
| Kraton RP-6510 | .5 |  |  | — | 30.0 | — | — | — | — |
| Kraton RP-52-14 | 2.5 |  |  | — | — | 30.0 | — | — | — |
| Kraton RP-6505 | 1.0 |  |  | — | — | — | 30.0 | — | — |
| Kraton RP 6501 | — | — | — | — | — | — | — | 30.0 | — |
| Surlyn 9910 | — |  |  | 15.1 | 15.1 | 15.1 | 15.1 | 15.1 | 15.1 |

TABLE 7-continued

| | % MA | 1 | 2 | 16 | 17 | 18 | 19 | 20 | 21 |
|---|---|---|---|---|---|---|---|---|---|
| Surlyn 8940 | — | | | 45.3 | 45.3 | 45.3 | 45.3 | 45.3 | 45.3 |
| White Masterbatch | — | | | 9.6 | 9.6 | 9.6 | 9.6 | 9.6 | 9.6 |
| Weight | | 45.6 | 45.4 | 45.6 | 45.3 | 45.4 | 45.4 | 45.3 | 45.7 |
| Compression | | 57 | 52 | 55 | 54 | 54 | 56 | 55 | 54 |
| C.O.R. | | .807 | .820 | .810 | .813 | .811 | .810 | .811 | .808 |
| Shore C Hardness | | 83 | 87 | 82 | 84 | 85 | 83 | 85 | 84 |
| Cut Resistance | | 2-3 | 2-3 | 2-3 | 2-3 | 2-3 | 2-3 | 2-3 | 2-3 |
| (1 = No mark | | | | | | | | | |
| 5 = Clean cut) | | | | | | | | | |

As a result, the golf ball cover compositions of the present invention produces golf balls exhibiting properties of enhanced playability without sacrificing distance and/or durability.

The invention has been described with reference to the preferred embodiments. Obviously, modifications and alterations will occur to others upon reading and understanding the preceding detailed description. It is intended that the invention be construed as including all such alterations and modifications insofar as they come within the scope of the claims and the equivalents thereof.

Having thus described the preferred embodiments, the invention is now claimed to be:

1. A golf ball comprising a core and a cover, wherein the cover is formed from a composition comprising from about 5 to about 50 parts by weight of a maleic anhydride modified copolymer and from about 95 to about 50 parts by weight of an ionomeric resin based on 100 parts by weight of the composition, wherein said maleic anhydride copolymer consists of a copolymer selected from the group consisting of a maleic anhydride modified ethylene-propylene copolymer and a maleic anhydride modified styrenic block polymer, and wherein said ionomeric resin is an ionic copolymer of an olefin and a metal salt of an unsaturated carboxylic acid.

2. A golf ball comprising a core and a cover, wherein the cover is formed from a composition comprising from about 15 to about 40 parts by weight of a maleic anhydride modified copolymer and from about 85 to about 60 parts by weight of an ionomeric resin based on 100 parts by weight of the composition, wherein said maleic anhydride copolymer consists of a copolymer selected from the group consisting of a maleic anhydride modified ethylene-propylene copolymer and a maleic anhydride modified styrenic block polymer, and wherein said ionomeric resin is an ionic copolymer of an olefin and a metal salt of an unsaturated carboxylic acid.

3. A golf ball comprising a core and a cover, wherein the cover is formed of a composition comprising from about 20 to about 35 parts by weight of a maleic anhydride modified copolymer and from about 80 to about 65 parts by weight of an ionomeric resin based on 100 parts by weight of the composition, wherein said maleic anhydride copolymer consists of a copolymer selected from the group consisting of a maleic anhydride modified ethylene-propylene copolymer and a maleic anhydride modified styrenic block polymer, and wherein said ionomeric resin is an ionic copolymer of an olefin and a metal salt of an unsaturated carboxylic acid.

4. A golf ball comprising a core and a cover, wherein the cover is formed of a maleic anhydride modified copolymer and an ionomeric resin, wherein said maleic anhydride modified copolymer consists of a copolymer selected from the group consisting of a maleic anhydride modified ethylene-propylene copolymer and a maleic anhydride modified styrenic block copolymer, and wherein said ionomeric resin is an ionic copolymer of an olefin and a metal salt of an unsaturated carboxylic acid.

* * * * *